Oct. 29, 1963   R. A. BROWN, JR   3,108,294
ESCAPE DEVICE FOR BEEHIVES
Filed Feb. 16, 1962

INVENTOR.
ROBERT A. BROWN, JR.
BY
ATTORNEYS

United States Patent Office 3,108,294
Patented Oct. 29, 1963

3,108,294
ESCAPE DEVICE FOR BEEHIVES
Robert A. Brown, Jr., 709 Dunbar St., Greenville, S.C.
Filed Feb. 16, 1962, Ser. No. 173,753
14 Claims. (Cl. 6—4)

The present invention relates to beehive escapes and is adapted to any type hive, and particularly to an escape which is embodied in the frame of a foraminous screen which is interposed between the brood chamber and queen excluder, and the super of the beehive when it is desired to remove surplus honey from the super. A particular feature of the escape is that it will allow the exit of the bees from the super naturally and without excitement, and will prevent their re-entry into the super of the hive.

In a prior method of taking surplus honey from the hive, the apiarist would remove the cover from the top of the super and would take the sections or frames from the super and then would have to brush the bees from the combs. Several problems were associated with this procedure. The bees in the super were excited by the removal of the cover and the entry of light, and as a result, might swarm or sting the apiarist. When the apiarist attempted to take the sections or frames from the super, the excited bees would fill themselves with honey, or would fight frantically to protect their product. This reduced the amount of honey harvested. A method used to quiet the bees prior to removing the honey was to permeate the interior of the hive with smoke which rendered them docile for a period of time; however, this was dangerous, due to the toxic effect it might have on the bees, and also, if not properly done, might result in a smoky taste being imparted to the honey.

A prior escape which has been used to some extent has a restricted area through which the bees must travel before emerging from the hive, but in many instances bees attempt to fill this area with propolis, and due to the configuration and location of the exit, this material is difficult to remove. Also, the prior escapes did not provide direct ventilation so in warm weather months the hives would become overheated and the beeswax would melt. They also failed to allow light to pass through them directly into the interior of the hive to induce the bees to egress from the super.

In general, the preferred form of the present invention is embodied in a frame so constructed as to conform to the dimensions of the hive, which can be inserted or removed at will, from between the super, and the brood chamber and queen excluder, and which has a wire mesh screen covering its bottom with the exit for the bees positioned in one side of the frame.

The exit comprises a plurality of circular openings of uniform diameter, each having a finger positioned diametrically across it and fastened to a base. These fingers are sufficiently flexible that a bee desirous of leaving the hive may readily bias the finger to one side to provide ample space to enable it to pass through the opening. As soon as the bee clears the opening, the finger will spring back to its original position, blocking the exit opening to the re-entry of the bee into the hive through the opening. When the frame is placed between the brood chamber and the queen excluder, and the super, the circular openings of the exit lead directly from the interior of the super to the outside. Hence, light will pass through the plurality of openings inducing the bees to egress from the super in an unexcited natural way. The exit openings simulate the usual entrance and exit opening from the hive and, therefore, readily are accepted by the bees. After the bees have egressed from the super, the apiarist can remove the sections or frames free of bees swarming, stinging, or filling themselves with honey. Since the device can be inserted or removed at will, any propolis put by the bees in the opening can easily be removed.

The wire mesh screen bottom of the frame allows circulation of air within the entire beehive. Consequently, there is no interference with temperature and moisture control as maintained by the bees. When food is given for winter stores, by adding food chambers or additional supers to the hive or taking food chambers or supers from one hive to give to another, the present invention provides means permitting evacuation of the bees prior to placement in the new hive, thus eliminating fighting and the unnecessary death of bees.

The invention will be further described in connection with the accompanying drawings and description which illustrate a preferred form of the apparatus:

The invention may be used with any conventional type of beehive including a hive body or brood chamber 1 mounted on a bottom board 2 and a super 3 in which the honeycomb frames or sections are placed and a hive cover 4. The beehive has the conventional opening for the entry and exit of bees from the hive and also has a conventional queen excluder located in the brood chamber which permits the smaller honey bees to pass into the super but prevents such passage of the larger queen.

Figure 1:
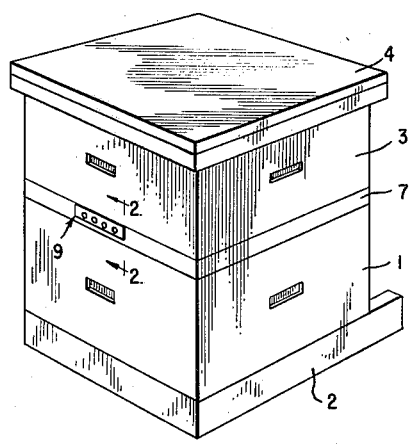
FIG. 1 is a rear view of a sectional hive with the escape device in place between the brood chamber and queen excluder, and the super.
Figure 2:
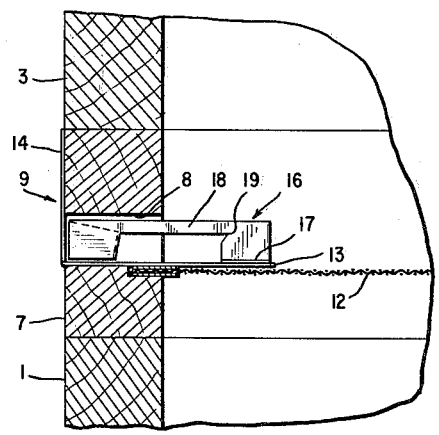
FIG. 2 is a partial vertical sectional view on an enlarge scale taken on line 2—2 of FIG. 1 showing the exit.
Figure 3:
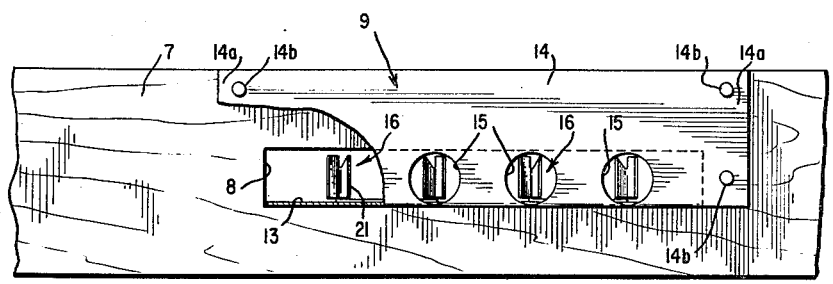
FIG. 3 is an enlarged rear view, partially in section, of the frame having the escape device.

The escape of the present invention is embodied in a rectangular frame 7 constructed of any sturdy material, such as wood, plastic, aluminum, or other material which is resistant to rust, temperature, water, moisture variations, rot and termites. When the escape is to be used, the frame is interposed between the brood chamber and queen excluder, and the super portions of the hive, as shown in FIG. 1. The width and length of the frame should be the same as the hive with which it is used. The depth can be varied as long as it can accommodate a slot 8 of sufficient depth to receive the escape device 9. The escape device is located at that side of the frame which is designated as the rear, since when the frame is in place in the hive the escape will be at the rear of the hive to lessen the possibility of the bees attempting to re-enter the hive through the escape device. The lower portion of the slot is flush or on the same plane with the upper surface of a wire screen 12 which is stretched across and secured to the frame 7 in any suitable manner.

The wire screen 12 should be rust and corrosion resistant to withstand the temperature and moisture variations in the hive. The openings in the screen should be large enough to allow the flow of ventilating currents to pass, but small enough to prevent the bees from passing through it. The strength of the screen must be such that it will not sag between its marginal supports with the added weight of the bees, normally a maximum of one pound.

The bee exit or escape device 9 is inserted in the slot 8 of the frame 7 and includes a base plate portion 13 of metal or other material of sufficient strength. The base plate portion lies on the wire screen 12 adjacent the slot and has the front portion thereof bent upwardly to a normal position. The upwardly bent portion 14 is of sufficient height that the edge thereof lies flush with the upper edge of the frame. It is of sufficient height to allow a plurality of circular egress openings 15 of uniform diameter just large enough to allow the easy egress of the bees to be located opposite the slot opening in the frame. The width of the upwardly bent portion 14 is greater than the width of the slot to provide side portions 14a having openings through which nails 14b are driven to secure it to the frame. The escape unit can be placed into the frame by sliding it through the slot 8 and then nailing the portion 14 to the frame. The exit unit also includes a plurality of spring fingers 16, the bases 17 of which are bent at right angles and affixed to the upper side of the base plate 13. The forward portions of the fingers terminate just inwardly of the respective openings 15 and are positioned diametrically across the circular egress openings. Each finger is made of a thin gauge strip of noncorrodible, flexible material, e.g., brass, copper, etc., of a height substantially equal to the diameter of the circular openings. These fingers must be sufficiently sensitive to be easily biased by the bee to either side of the circular opening which it normally obstructs as the bee egresses from the hive.

To impart maximum sensitivity and flexibility to the spring fingers 16, the upper mid-section of each finger is cut away so that the portions 18 of the fingers extending forwardly from their bases 17 to a point near their forward ends is less than half the width of the end portions of the fingers. To impart further flexibility and sensitivity to the fingers they are slightly undercut at 19 where their narrower mid-sections join the wider rear portions. This undercut has the further advantage of preventing stress in the material on the single line where the narrower mid-sections of the fingers connect with the wider rear portion, as the fingers are biased back and forth by egressing bees. The undercuts further enable the fingers to move torsionally under pressure from the bees, thereby preventing possible injury to smaller bees. Since the purpose of the fingers is normally to obstruct passage of the bees through the openings, their forward ends should possess an effective cross-sectional area sufficient to obstruct the circular egress openings 15 and prevent the bee's re-entry into the super through the same circular opening. To this end, the forward end of each finger 15 is provided with a forwardly bent section 21 extending from the forward end of the cut-away mid-section to a position substantially flush with the forward end of the finger. These forwardly bent sections diverge outwardly from the plane of the fingers in generally V-shape so that their forward ends are spaced a substantial distance from the ends of the fingers proper, thereby providing an effective width at the diameter of the openings which is sufficient to prevent exit of the bees from the super until the fingers are flexed to one side or the other by the bees. To assure maximum effectiveness of the ends of the fingers in normally obstructing egress of the bees through the openings 15 and re-entry of the bees into the super, the forwardly bent section 21 in side elevation is cut on an upward slant so that its forward end is of substantially the same height as the height of the forward end of the finger proper.

Figure 4:
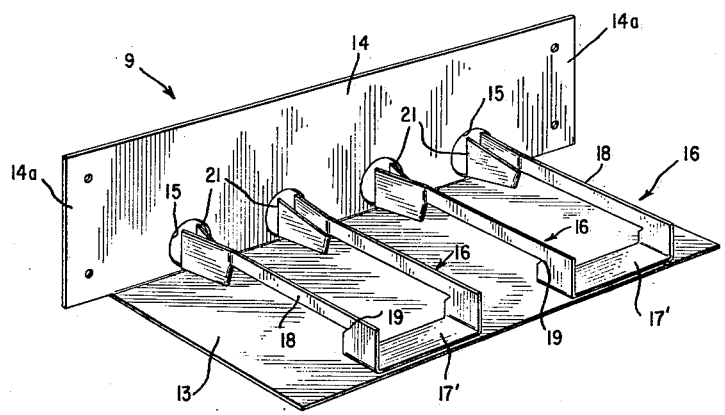
FIG. 4 is a perspective view of the escape removed from the frame.

As seen in FIG. 4, it is preferred to form the spring fingers 16 in pairs with a common base 17' which is affixed to the base plate.

In use of the escape device of the invention, when the apiarist desires to evacuate the bees from the super of the hive for some reason, such as to collect surplus honey at harvest time, he will lift the super enough to enable him to insert the frame 7 with the escape 9 between the brood chamber and its queen excluder, and the super of the hive, as shown in FIG. 1. The bees in the super are attracted by the direct entrance of light coming through the circular openings and thereby induced to egress directly to the outside of the hive by biasing the spring fingers 16 and egressing through the circular openings. After each bee clears the end of the finger, the finger will return to its normal position in front of the circular opening, so obstructing the opening that the bee cannot re-enter into the super through the opening. At the same time, any bees below the screen in the brood chamber which may desire to go up into the super are prevented from doing so by the screen 12 covering the entire top of the brood chamber. After a suitable period of time, when the bees have egressed from the super, the apiarist lifts the top of the hive covering the super and withdraws the honeycomb sections or frames individually if all are not capped or sealed and mature, or he may remove the entire super. The few bees that might be remaining easily can be brushed away from the combs.

While the invention has been described in connection with a preferred form of escape device, it is to be understood that various changes may be made in the details of construction within the scope of the appended claims.

I claim:

1. A bee escape for a beehive comprising a member having an opening leading from the inside of the hive to the exterior thereof, and a finger having an end thereof terminating sufficiently close to the inside of said opening to prevent the movement of bees between said end and the inside of said opening, said end of the finger having outside surfaces extending substantially in a vertical plane, said finger being mounted for flexing in a horizontal direction, the end of the finger adjacent said opening bridging a sufficient portion of the width of said opening as to normally prevent egress and entry of bees therethrough, said finger being sufficiently flexible that it readily may be flexed to one side by a bee to permit such bee to pass through said opening.

2. A bee escape device as defined in claim 1 in which said end of the finger lies generally in a vertical plane passing substantially through the center of said opening.

3. A bee escape device as defined in claim 1 in which the width of the forward end of the finger is enlarged to obstruct a substantial portion of the area of the opening.

4. A bee escape device as defined in claim 1 in which said member has a plurality of openings, and a cooperating finger for each opening, said fingers being in pairs and having a common base portion secured to said base plate portion.

5. A bee escape device as defined in claim 1 in which the member having the opening includes a base plate portion extending inwardly therefrom, and means attaching the finger to the base plate portion.

6. A bee escape device as defined in claim 5 in which the member having the opening extends upwardly from the forward edge of the base plate portion, and in which the end of the finger remote from the opening is attached to the upper side of the base plate portion.

7. A bee escape device as defined in claim 1 in which the finger has an elongated longitudinal mid-section of less than the end sections to provide greater flexibility.

8. A bee escape device as defined in claim 7 in which the finger is undercut where the narrower mid-section joins the rear portion.

9. A bee escape device as defined in claim 7 in which the end portion of the finger adjacent the opening includes the finger proper, and a portion cut from the edge of the finger and forwardly bent and spaced from the side of the finger, thereby to impart greater effective width and greater obstruction effect to the forward end of the finger.

10. A bee escape device as defined in claim 9 in which the lateral edges of the forwardly bent section diverge forwardly and the width of said section at its forward end is substantially the same as the width of the forward end of the finger proper.

11. A bee escape device comprising a frame adapted to be inserted between a super, and the brood chamber and its queen excluder of a beehive, said frame having a foraminous member extending thereacross and a slot located in and extending through one side of said frame, a member secured to the frame and having an opening therein in alignment with the slot in the frame, a finger having an end thereof terminating sufficiently close to the inside of said opening to prevent the movement of bees between said end and the inside of said opening, said end of the finger having outside surfaces extending substantially in a vertical plane, said finger being mounted for flexing in a horizontal direction, the end of the finger adjacent said opening bridging a sufficient portion of the width of said opening as to normally prevent egress and entry of bees therethrough, said finger being sufficiently flexible that it readily may be flexed to one side by a bee to permit egress of such bee through said opening.

12. A bee escape device as defined in claim 11 in which the lower edges of the slot and opening lie substantially in the plane of the upper surface of said foraminous member.

13. A bee escape device as defined in claim 11 in which the member having the opening includes a base plate portion extending inwardly therefrom beyond the frame and said base plate portion lies substantially in the plane of the upper surface of said foraminous member of the frame.

14. A bee escape device as defined in claim 11 in which said member has a plurality of openings, each of which is aligned with the slot, and a cooperating finger for each opening, the member having the plurality of openings having an inwardly extending base plate portion, said fingers being in pairs and having a common base portion secured to said base plate portion.

References Cited in the file of this patent

UNITED STATES PATENTS

| | | |
|---|---|---|
| 346,023 | Butler | July 20, 1886 |
| 489,754 | Porter | Jan. 10, 1893 |
| 1,089,157 | Rogers | Mar. 3, 1914 |
| 1,636,635 | Holmes | July 19, 1927 |